UNITED STATES PATENT OFFICE.

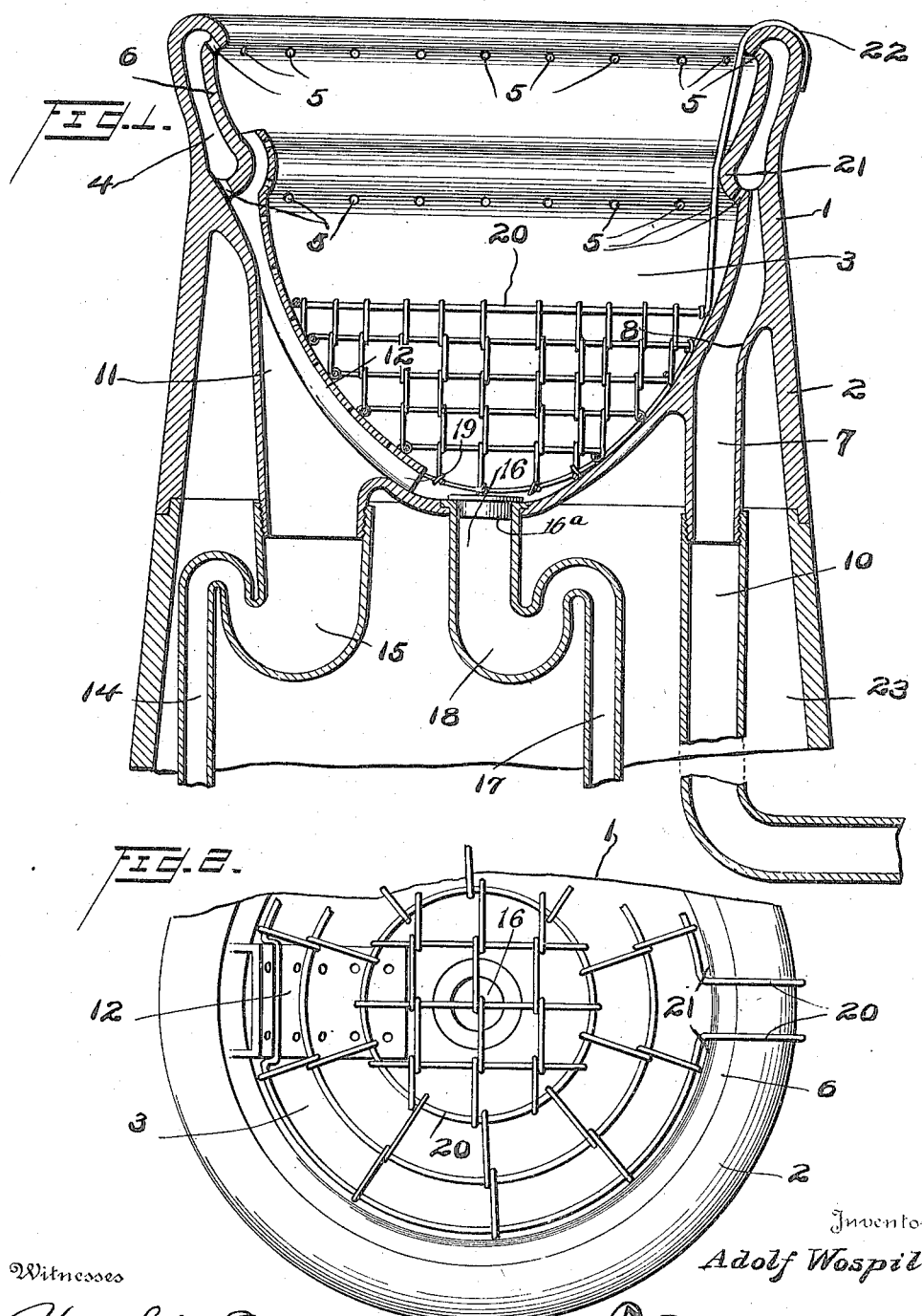

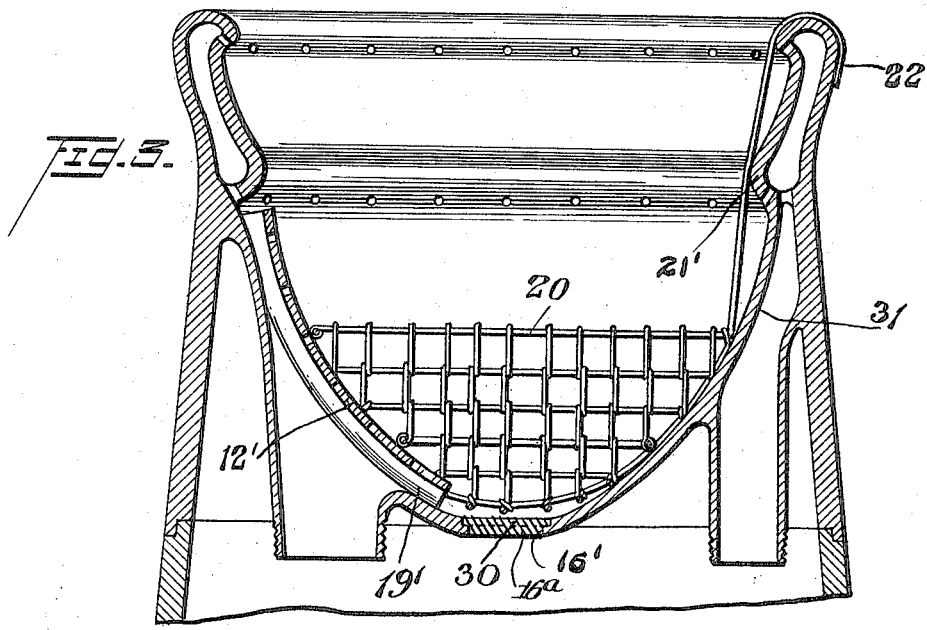
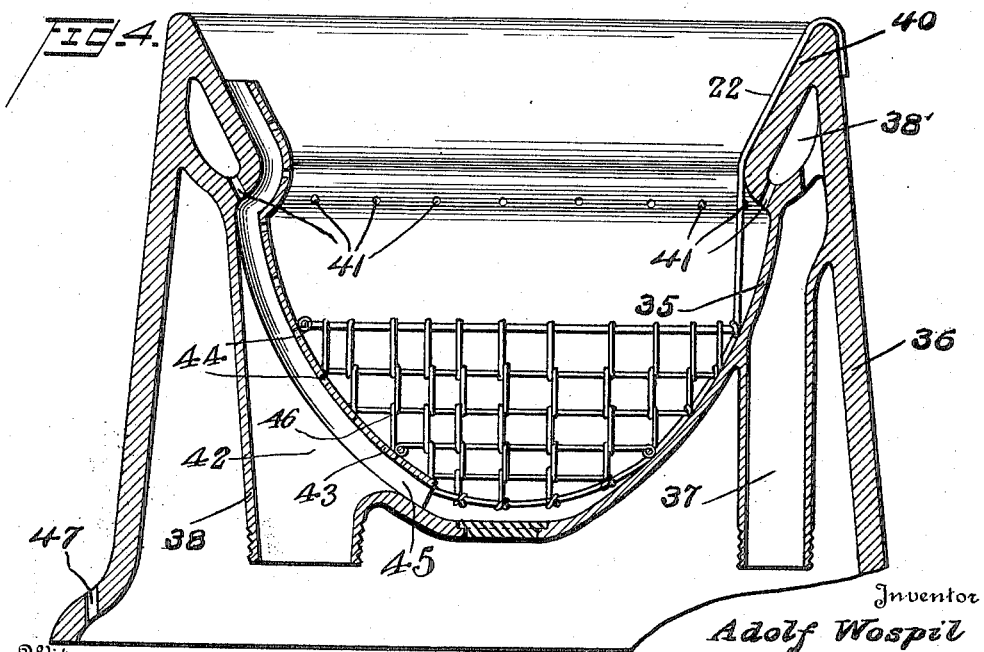

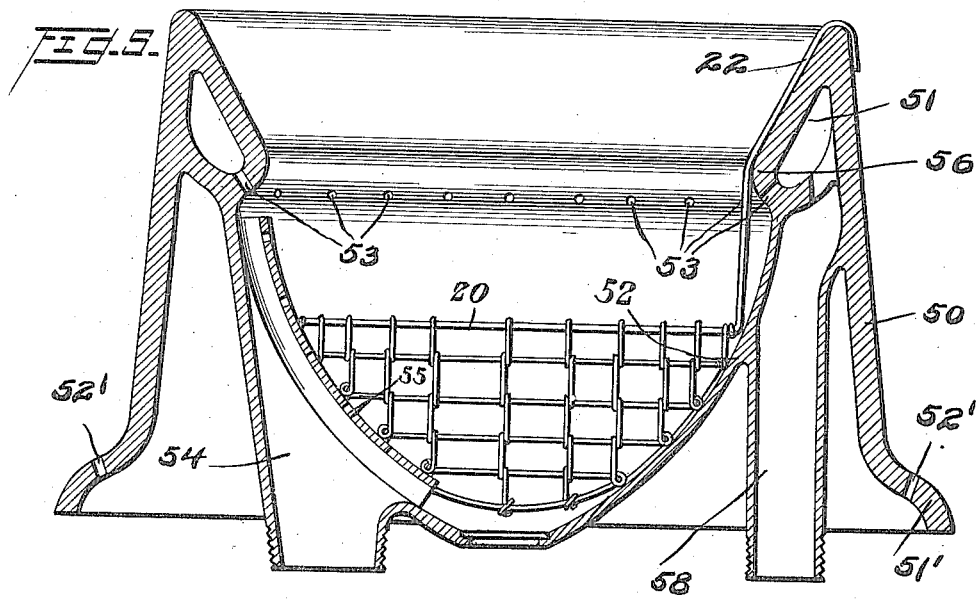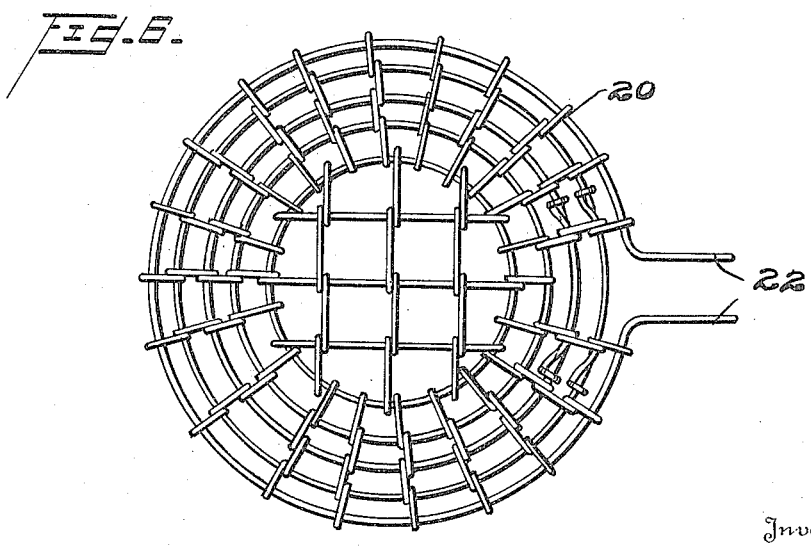

ADOLF WOSPIL, OF TRENTON, NEW JERSEY.

CUSPIDOR.

1,166,298.

Specification of Letters Patent. Patented Dec. 28, 1915.

Application filed June 22, 1914. Serial No. 846,599.

*To all whom it may concern:*

Be it known that I, ADOLF WOSPIL, a subject of the Emperor of Germany, residing at Trenton, in the county of Mercer and State of New Jersey, have invented certain new and useful Improvements in Cuspidors; and I do hereby declare the following to be a full, clear, and exact description of the invention, such as will enable others skilled in the art to which it appertains to make and use the same.

This invention relates to spittoons or cuspidors and the primary object of the invention is the provision of a cuspidor constructed so that it may be flushed by a current of water at predetermined times, or whenever desired, for thoroughly cleansing the same.

Another object of this invention is the provision of a cuspidor as specified which has an outlet positioned upon one side thereof and screened so as to prevent the clogging of the outlet by particles of tobacco, cigarette stumps, or the like.

Another object of this invention is the provision of a cuspidor as specified which has a plurality of outlets, one being positioned in the center of the bottom of the cuspidor to provide for the thorough cleansing of the bowl to provide for the passage of the liquid contained in the cuspidor therefrom.

A still further object of the invention is the provision of a removable screen mounted within the bowl of the cuspidor for preventing cigarettes or composite articles from falling into the bowl proper and clogging the outlet of the same.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1 is a central sectional view through the improved cuspidor, Fig. 2 is a fragmentary plan view of the cuspidor, Fig. 3 is a central section through a modified form of the cuspidor showing a plurality of serially arranged flushing openings, Fig. 4 is a sectional view through a modified form of the cuspidor showing only a single set of flushing openings and showing the screen for guarding the outlet of the cuspidor bowl extending upwardly into the receiving flange of the same, Fig. 5 is a central sectional view through another modified form of the cuspidor, Fig. 6 is a plan view of the screen which is positioned within the bowl of the cuspidor to prevent the passage of cigarette or cigar stumps or other composite substances into the bowl proper.

Referring more particularly to the drawings, 1 designates the cuspidor bowl as an entirety, which bowl has an outer supporting flange 2, which entirely encompasses the bowl exteriorly thereof. The supporting flange is enlarged at the upper end of the same, and is provided with an annular extending channel 4, which extends entirely around the interior of the bowl and has communication with the interior of the bowl through a plurality of egressing openings 5, which are arranged serially about the inner circumference of the wall adjacent the inner end of the same as is clearly shown in Fig. 1 of the drawings. The egressing openings 5 are arranged serially about the interior of the wall in spaced circles, one being positioned above the other, for providing for the efficient flushing of the upper receiving flange 6 of the cuspidor which is formed by the enlarging of the upper terminal of the supporting wall, and also for providing for the efficient flushing of the bowl.

The bowl has an extension 7 formed thereupon, which extension depends from one side of the bowl and has communication with the water channel 4 through an opening 8, which extends longitudinally through the extension and has communication with the channel 4 at the lower edge of the same, as is clearly shown in Fig. 1 of the drawings. The extension 7 has communication with a water inlet pipe 10, so as to provide for the flow or passage of water into the channel 4 for flushing the bowl.

The bowl has a second extension 11 formed thereupon, which extension is hollow and has communication with the interior of the bowl at one side thereof oppositely to the extension 7 and the extension 11 is provided for the cleansing of the bowl or for the passage of the flushing water and the substance contained within the bowl therefrom.

A screen 12 is mounted within the bowl and covers the communicating opening between the bowl and the hollow extension 11, so as to prevent particles of tobacco or the like from passing into the extension 11 and clogging the same. An egressing pipe 14 is connected to the extension 11 in fluid-tight engagement therewith and has a goose neck 15 formed therein, which goose neck is provided for retaining a quantity of the flushing water for preventing the gases or obnoxious odors from entering the room in which the cuspidor is mounted.

An opening 16 is formed in the center of the bottom of the bowl and it has a pipe 17 connected thereto, which pipe has a goose neck 18 formed therein for retaining a small quantity of the flushing water to prevent the sewer gases or obnoxious odors from entering the room. The opening 16 is closed by a plug 16ª and it is provided for cleansing or thoroughly cleaning the bowl and permitting of the passage of particles of tobacco or cigar or cigarette stumps or the like from the bowl if it is so desired. The screen 12 is positioned outwardly from the surface of the bowl and its lower end is opened as is shown at 19, so that when the flushing water enters the bowl through the various openings 5, it will pass along the inner side of the wall of the bowl and up through the opening 19, carrying small particles of tobacco and composite substances upwardly therethrough and into the hollow extension 11 and from thence outwardly through the pipe 14.

A foraminous protective screen 20 is mounted within the cuspidor and extends downwardly thereinto, being shaped to fit slightly within the interior of the bowl, and being supported by contact with the inner surface of the wall of the cuspidor and it is provided for the purpose of preventing cigarette or cigar stumps or like composite articles from passing downwardly into the egressing openings of the cuspidor and clogging the same.

The foraminous protective screen is constructed of resilient wire, and the outermost section of which the screen is formed has two handles 22 formed thereupon, which handles extend upwardly out of the cuspidor bowl and rest upon the receiving flange of the cuspidor, supporting the screen within the bowl as well as providing handles for the efficient removal of the screen from the bowl. When it is desired to remove the screen from the bowl, the handles 22 are pressed toward each other, which constricts the outer circumference of the screen and permits the same to be easily removed from the interior of the bowl of the various cuspidors.

The screen 20 rests within the cuspidor below the uppermost annular ring of the openings 5, so that the water which flushes the cuspidor will pass through the screen and carry with it any small particles of substance which is resting upon the screen.

In Fig. 1 of the drawings, a supporting base or ring 23 is provided upon which the lower end of the flange 2 rests.

In Fig. 3 of the drawings a modified form of the cuspidor is shown, which modified form is identical to the cuspidor illustrated in Fig. 1 in every respect with the exception of the screen 12 and of the pipe 17, which is eliminated therefrom.

In Fig. 3 of the drawings the screen 12' terminates below the angular hump 21' which is formed in the cuspidor while in Fig. 1 it extends upwardly and over and partially along the length of the inner wall of the upper portion of the cuspidor. The bowl has an opening 16' formed in the center of the base thereof, which opening is normally closed by a plug 30 and is provided for the purpose of cleaning the bowl when desired, and for permitting of the passage of cigar stumps, cigarette stumps or like composite articles in the interior of the bowl, which articles would not pass outwardly through the opening 19' formed within the lower terminus of the screen 12'.

In Fig. 4 of the drawings a still further modified form of the cuspidor is shown, and this cuspidor constitutes a bowl 35 which is mounted interiorly of a supporting wall or flange 36, and the bowl has extensions 37 and 38 formed thereupon. The extension 37 is provided to permit of the ingressing of water into the water race 38', which is formed interiorly within the upper end of the wall 36. The wall 36 is bent downwardly from its upper marginal edge and inclined inwardly toward the center of the bowl, providing a receiving flange interiorly of the cuspidor, which tapers inwardly so that the spittal or the like will pass down the side and into the bowl proper. The receiving flange 40 is provided with a plurality of annularly disposed openings 41 in the lower terminus of the same, through its openings which are provided for the passage of the flushing water out of the water race 38' into the bowl 35 for flushing the same. The communicating opening 42, which communicates with the bowl 35 and the hollow extension 38, has a screen 43, positioned thereover, which screen is formed integrally with the section of the bowl 35 and extends upwardly along the inner wall of the bowl covering the opening 42 and it also extends upwardly a short distance along the inner wall of a portion of the receiving flange 40. The screen 43 is provided with a plurality of openings 44, which openings permit the passage of liquid therethrough into the hollow extension 38, but which will prevent the passage of particles of substance therethrough and into the opening. The lower end of the screen is opened, providing an egressing opening 45, through which the substance contained within the bowl 35 is forced upon the flushing of the bowl. A screen 46 which extends transversely across the cuspidor is mounted therein, and it is identical in construction with the screen 20 and serves a similar function. The supporting wall 36 is flared outwardly at the base thereof and is provided with openings 47 formed therein, which openings receive any suitable type of fastening means (not shown), for securing the cuspidor to the floor or other suitable permanent structure.

In Fig. 5 of the drawings an additional modified form of the cuspidor is shown, in which a circular supporting wall 50 having its lower end flared outwardly to form a supporting base 51', which supporting base is provided with openings 52' for the reception of any suitable type of fastening means. The supporting wall 50 is bent downwardly or extends downwardly and inwardly toward the central axis of the bowl upon the upper marginal edge of the same, providing an inclined receiving flange which is hollow so as to provide a race 51 for the passage of water about therein for properly flushing the bowl 52 through the various openings 53. The openings 53 are formed within the lower end of the inclined receiving flange of the cuspidor and are disposed circumferentially about the interior wall of the same. A pipe 54 is formed upon one side of the bowl on the outer surface of the bowl and it is hollow being provided for the passage of the substance out of the bowl 52. A screen 55 which is formed integral with the bowl 52 is positioned over the communicating opening between the bowl and the pipe or extension 54 and in this figure it terminates inwardly of the hump or flange 56, which is formed at the lower terminus of the receiving flange of the cuspidor. The bowl also has an extension or pipe 58 formed integral therewith and which is provided for the ingress of water into the water race 51 for the proper flushing of the cuspidor. In other respects this cuspidor is identical in construction to the cuspidor illustrated in Fig. 4 of the drawings.

In each and every instance of the cuspidor heretofore described and illustrated in the drawings, the supporting flange or wall, the receiving flange, the bowl, the extensions formed thereupon and the screens which cover the communication between the egressing pipe and the bowl are formed integrally with each other, forming a composite cuspidor which may be cast or molded in a single piece.

In reducing the invention to practice such minor features of construction, combination and arrangement of parts may necessitate alterations to which the patentee is entitled provided such alterations are comprehended within the scope of what is claimed.

What is claimed is:—

1. In a cuspidor structure, a body cast of a single piece of material and having inner and outer spaced walls, the inner wall being substantially semispherical in shape for forming a receiving bowl, the outer wall flaring outwardly as it extends downwardly from its point of connection with the inner wall and forming a supporting and protecting structure for the bowl, the uppermost portion of said inner wall extending inwardly toward the center of the bowl and outwardly for connection with the inner surface of the outer wall a short distance below its upper edge for forming a water race, an inlet pipe formed integrally with said walls exteriorly of the inner wall and interiorly of the outer wall, said pipe having communication with said water race, an outlet pipe formed integrally with said inner wall at a point substantially diametrically opposite of said inlet pipe and positioned interiorly of said outer wall, said inner wall being provided with a plurality of flushing openings communicating with the interior of the bowl, said inner wall being provided with an opening which communicates with the receiving end of said outlet pipe, and a screen formed integral with said inner wall and spanning said opening, said screen having its upper and lower ends open and spaced from the inner surface of said inner wall.

2. In a cuspidor structure, a body cast of a single piece of material and having inner and outer spaced walls, the inner wall being substantially semispherical in shape for forming a receiving bowl, the outer wall flaring outwardly as it extends downwardly from its point of connection with the inner wall and forming a supporting and protecting structure for the bowl, the uppermost portion of said inner wall extending inwardly toward the center of the bowl and outwardly for connection with the inner surface of the outer wall a short distance below its upper edge for forming a water race, an inlet pipe formed integrally with said walls exteriorly of the inner wall and interiorly of the outer wall, said pipe having communication with said water race, an outlet pipe formed integrally with said inner wall at a point substantially diametrically opposite of said inlet pipe and positioned interiorly of said outer wall, said inner wall being provided with a plurality of flushing openings communicating with the interior of the bowl, said inner wall being provided with an opening which communicates with the receiving end of said outlet pipe, a screen formed integral with said inner wall and spanning said opening, said screen having its upper and lower ends open and spaced from the inner surface of said inner wall, said inner wall being provided with an auxiliary outlet opening in the center of the bottom of the bowl formed thereby.

In testimony whereof I affix my signature in presence of two witnesses.

ADOLF WOSPIL.

Witnesses:
VALENTIN EDL,
TOBIAS RICKER.

Copies of this patent may be obtained for five cents each, by addressing the "Commissioner of Patents, Washington, D. C."